United States Patent
Seack (10) Patent No.: US 12,441,457 B2
(45) Date of Patent: Oct. 14, 2025

(54) LOAD INTRODUCTION SYSTEM AND A METHOD FOR MANUFACTURING A LOAD INTRODUCTION SYSTEM

(71) Applicant: AIRBUS OPERATIONS GMBH, Hamburg (DE)

(72) Inventor: Oliver Seack, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 183 days.

(21) Appl. No.: 18/322,096

(22) Filed: May 23, 2023

(65) Prior Publication Data
US 2023/0382514 A1      Nov. 30, 2023

(30) Foreign Application Priority Data

May 24, 2022    (EP) ..................... 22175160

(51) Int. Cl.
*B64C 9/02*       (2006.01)
*B64C 9/16*       (2006.01)

(52) U.S. Cl.
CPC . *B64C 9/02* (2013.01); *B64C 9/16* (2013.01)

(58) Field of Classification Search
CPC ...................................... B64C 9/02
See application file for complete search history.

(56) References Cited

U.S. PATENT DOCUMENTS

| | | | | |
|---|---|---|---|---|
| 3,009,845 | A * | 11/1961 | Wiser ............... | B32B 17/10036 52/203 |
| 4,964,594 | A * | 10/1990 | Webb ..................... | F16B 37/14 411/103 |
| 7,153,054 | B2 * | 12/2006 | Arbona ................... | F16B 35/06 403/30 |
| 9,227,722 | B2 * | 1/2016 | Soenarjo .................. | B64C 3/50 |
| 9,377,038 | B2 * | 6/2016 | David ....................... | F16B 5/00 |
| 9,889,922 | B2 * | 2/2018 | Soenarjo .................. | B64C 9/18 |
| 11,161,594 | B2 | 11/2021 | Tsai et al. | |

(Continued)

FOREIGN PATENT DOCUMENTS

| | | |
|---|---|---|
| EP | 1598562 A1 | 11/2005 |
| EP | 2578489 B1 | 4/2013 |

(Continued)

OTHER PUBLICATIONS

Extended European Search Report for Application No. EP 22175160.5, dated Oct. 18, 2022, 9 pages.

*Primary Examiner* — Joseph W Sanderson
(74) *Attorney, Agent, or Firm* — Nixon & Vanderhye P.C.

(57) ABSTRACT

A load introduction system is disclosed including an aerodynamic structure component having an upper skin section and a lower skin section, an attachment unit and a load introduction unit configured to couple the attachment unit to the aerodynamic structure component. The load introduction unit includes a longitudinal connection element with its first end positioned at the upper skin section. The longitudinal connection element extends through the lower skin section such that its second end is positioned outside of the aerodynamic structure component. The first end is anchored to the upper skin section and the second end is anchored to the attachment unit such that the longitudinal connection element forces the attachment unit against the lower skin section.

14 Claims, 4 Drawing Sheets

(56) References Cited

U.S. PATENT DOCUMENTS

| | | | |
|---|---|---|---|
| 11,292,596 B2* | 4/2022 | Grubb | B64C 23/069 |
| 11,303,047 B2* | 4/2022 | Hansen | H01R 4/56 |
| 11,933,353 B2* | 3/2024 | Smeal | B64C 9/16 |
| 2005/0260034 A1* | 11/2005 | Arbona | F16B 5/0241 |
| | | | 403/408.1 |
| 2013/0087662 A1* | 4/2013 | Soenarjo | B64C 9/18 |
| | | | 244/215 |
| 2013/0099062 A1 | 4/2013 | Seack et al. | |
| 2013/0180096 A1* | 7/2013 | David | F16B 5/00 |
| | | | 29/525.01 |
| 2016/0068255 A1* | 3/2016 | Soenarjo | B64C 9/18 |
| | | | 244/215 |
| 2018/0141636 A1* | 5/2018 | Currie | B64C 3/50 |
| 2019/0168872 A1* | 6/2019 | Grubb | B64F 5/10 |
| 2019/0367157 A1* | 12/2019 | Gibbert | B64C 9/22 |
| 2021/0210873 A1* | 7/2021 | Hansen | B29C 66/21 |
| 2022/0001973 A1* | 1/2022 | Block | F16B 37/048 |
| 2022/0299063 A1* | 9/2022 | Smeal | B64C 9/16 |
| 2024/0199194 A1* | 6/2024 | Seack | B64C 9/02 |
| 2024/0199195 A1* | 6/2024 | Seack | B64C 9/02 |

FOREIGN PATENT DOCUMENTS

| | | |
|---|---|---|
| EP | 3575206 A1 | 12/2019 |
| KR | 10-20090063471 A | 6/2009 |
| WO | 2019156604 A1 | 8/2019 |

\* cited by examiner

LOAD INTRODUCTION SYSTEM AND A METHOD FOR MANUFACTURING A LOAD INTRODUCTION SYSTEM

CROSS REFERENCE TO RELATED APPLICATION

This application claims priority to and incorporates by reference the entirety of European Application Number EP 22175160.5, filed May 24, 2022.

FIELD OF THE INVENTION

The invention relates to improved attachment and load transmission concepts of aerodynamic structures. In particular, the invention relates to a load introduction system and a method for manufacturing a load introduction system.

TECHNICAL BACKGROUND

The transmission of loads among components of aerodynamic systems is an important aspect that has to be considered during the design process of such systems. In particular, strength requirements, low manufacturing/assembly costs in combination with a reliable and stable manufacturing/assembly process are the most important issues that have to be dealt with during the design process. The usage of fiber reinforced materials which has become more popular over the recent years allows to reduce the number of parts that have to be assembled, but makes the design process even more challenging since material behaviors are different when compared to systems in which a plurality of different parts are assembled. For example, the so-called "unfolding" of layers of a fiber reinforced material is a behavior of fiber reinforced materials that should be avoided in order to provide enhanced structural stability and strength requirements.

EP 3 575 206 A1 describes a system for driving a flap arrangement between a retracted position and an extended position, a wing having such a system as well as an aircraft. EP 2 578 489 A2 describes a flap support structure for an aircraft wing having a trailing edge flap. The flap support structure comprises a flap support beam including an aerodynamic fairing and a drive unit including a universal support structure which rotatably receives a drive shaft connected to a drive arm for moving the trailing edge flap. The universal support structure also forms part of the flap support beam and supports the aerodynamic fairing.

SUMMARY

It may be seen as an object of the invention to improve the load transmission within fiber reinforced aerodynamic structures.

A system and a method according to the features of the independent claims are provided. Further embodiments of the invention are evident from the dependent claims and from the following description.

According to an aspect of the invention, a load introduction system is provided. The load introduction system comprises an aerodynamic structure component, for example a flap component, having an upper skin section and a lower skin section. The load introduction system further comprises an attachment unit for coupling the aerodynamic structure component to a base system, for example a wing system of an aircraft. The load introduction system also comprises a load introduction unit which is configured to couple the attachment unit to the aerodynamic structure component and to transfer a load from the aerodynamic structure component to the attachment unit. The load introduction unit comprises a longitudinal connection element having a first end and a second end, wherein the first end of the longitudinal connection element is positioned at the upper skin section and the longitudinal connection element extends through the lower skin section of the aerodynamic structure component such that the second end of the longitudinal connection element is positioned outside of the aerodynamic structure component. The first end of the longitudinal connection element is anchored to the upper skin section of the aerodynamic structure component and the second end of the longitudinal connection element is anchored to the attachment unit such that the longitudinal connection element forces, e.g., pulls or clamps, the attachment unit against the lower skin section of the aerodynamic structure component, thereby coupling the attachment unit to the aerodynamic structure component.

With such a load introduction system, it is possible to provide an improved load transmission within an aerodynamic system, especially within an aerodynamic system with fiber reinforced aerodynamic structures. The load introduction system provides an enhanced solution for load transmissions within the fiber reinforced parts of such an aerodynamic system. For example, the inventive load introduction system enables a load transmission from and into the fiber reinforced parts while avoiding undesired behaviors like the "unfolding" of the layers within the fiber reinforced parts. In addition, the inventive load introduction system provides a simplified assembly, the required structural strength and safety, has low manufacturing and assembly costs, and also ensures a reliable and stable manufacturing and assembly process for the load introduction system itself as well as for related components which are directly affected by the load transmission characteristics of the load introduction system.

The inventive load introduction system may be part of an aircraft system. For example, the load introduction system is a mechanical device which is configured to mount aerodynamic structure components, in particular movables like flaps, slats, leading edge high lift devices, ailerons, spoilers, flaperons, vertical and horizontal stabilizers, elevators, rudders or doors to a corresponding base system. Although, in the following, the load introduction system will be mainly described as being used for the attachment and load transmission of an aircraft flap to an aircraft wing, it should be understood that the load introduction system can also be used for other technical applications or for attaching any other of the above-mentioned exemplary aerodynamic structures.

As stated above, the load introduction system comprises an aerodynamic structure component having an upper skin section and a lower skin section. The upper and lower skin sections may form a single integral part which represents the aerodynamic structure component. The aerodynamic structure component may have a cross-section in the form of an airfoil.

The attachment unit of the load introduction system is configured to attach the aerodynamic structure component to the base system which for instance is a wing of an aircraft. Alternatively, the base system may be part of a vertical or horizontal stabilizer of an aircraft, or the base system may be part of a fuselage of an aircraft. For example, the attachment unit may couple a door to an aircraft fuselage. The attachment unit may be positioned at the lower skin and outside of the aerodynamic structure component. For example, the attachment unit abuts against the lower skin section of the aerodynamic structure component. The attachment unit may be made of a milled aluminum part.

The load introduction unit which is also part of the inventive load introduction system is adapted to couple the attachment unit to the aerodynamic structure component, thereby coupling the aerodynamic structure component to the base system. The load introduction unit transmits or transfers a load between the attachment unit and the aerodynamic structure component. The load introduction unit may include a limited number of parts which are assembled to the aerodynamic structure component and the attachment unit in order to provide the above-mentioned advantageous effects. In detail, the load introduction unit comprises a longitudinal connection element having a first end and a second end, wherein the first end of the longitudinal connection element is positioned at the upper skin section. A hole, for example a bore, through the upper skin section may be provided through which the longitudinal connection element can be inserted. The longitudinal connection element extends through the lower skin section of the aerodynamic structure component, for example through a hole, e.g., bore, in the lower skin section which is positioned opposite to the hole in the upper skin section.

Since the longitudinal connection element extends through the hole of the lower skin section, the second end of the longitudinal connection element protrudes from the lower skin section and is thus positioned outside of the aerodynamic structure component. The first end of the longitudinal connection element is anchored, e.g., attached or mounted, to the upper skin section of the aerodynamic structure component, for example at the hole in the upper skin section. In an example, the first end of the longitudinal connection element is fixed within the hole of the upper skin section. The second end of the longitudinal connection element is fixed to the attachment unit. Due to the fixation of the first end at the upper skin section and the fixation of the second end at the attachment unit, the longitudinal connection element forces, e.g., pulls or clamps, the attachment unit against the lower skin section of the aerodynamic structure component. The fixation of the first end to the upper skin section and the attachment of the second end to the attachment unit, for which different possibilities exist, will be described in more detail with reference to the Figures below. The load introduction unit thus couples the attachment unit to the aerodynamic structure component. During this coupling, it is possible that the longitudinal connection element is subjected to a tension force since it pulls the attachment unit onto the lower skin section of the aerodynamic structure component.

According to an embodiment, the aerodynamic structure component is an integrally formed structure.

Thus, the aerodynamic structure component may be a single integrally formed component. The integrally formed aerodynamic structure component may have a box-like structure which in its cross-section has an aerodynamic profile. In particular, the upper skin section and/or the lower skin section may have a curved aerodynamic surface. The usage of an integrally formed structure reduces the number of parts which are required to assemble the aerodynamic structure component, thereby reducing the manufacturing and maintenance costs. In addition, the overall weight can be reduced while still fulfilling required structural strength requirements.

According to an embodiment, the aerodynamic structure component includes a plurality of spar elements extending within the aerodynamic structure component between the first skin section and the second skin section, wherein the spar elements are integrally formed with the upper skin section and the lower skin section, thereby providing an integrally formed aerodynamic structure component.

The aerodynamic structure component may thus provide a multi-spar flap design. The spar elements basically improve the structural performance and integrity of the aerodynamic structure component or a flap into which the aerodynamic structure component is integrated. Due to the extension of the spar elements between the lower and upper skin section, channels are provided within the aerodynamic structure component which are separated from each other by respective ones of the spar elements. Due to the integral connection between a spar element and the upper or lower skin section, radii in the connecting regions between these components may occur. These radii may be subjected to bending loads when the aerodynamic structure component is in an assembled state. The inventive load introduction system, however, provides a solution which reduces such bending loads and thus also avoids the above-mentioned "unfolding" process when, for instance, fiber reinforced materials are used for the upper and lower skin sections as well as for the spar elements.

According to an embodiment, the aerodynamic structure component is made of a carbon fiber reinforced material, herein also referred to as carbon fiber reinforced plastics (CFRP).

The usage of carbon fiber reinforced material for the aerodynamic structure component provides many advantages in terms of weight, manufacturability, load transmission and maintenance effort. In particular, the aerodynamic structure component may represent a single piece integrally formed flap structure. It is possible that the upper and lower skin section as well as the spar elements are all integrally formed by the carbon fiber reinforced material.

According to an embodiment, the longitudinal connection element extends along a main extension direction of the longitudinal connection element and the upper skin section has an aerodynamic surface, wherein the main extension direction of the longitudinal connection element is arranged substantially perpendicular with respect to the aerodynamic surface of the upper skin section.

The aerodynamic surface of the upper skin section may be part of an outer skin of the aerodynamic structure component which, during operation, is subjected to an air flow. Since the first end of the longitudinal connection element is anchored to the upper skin section and may thus interfere with the aerodynamic surface of the upper skin section, the first end may be formed to be substantially flush with the aerodynamic surface of the upper skin section in order to avoid aerodynamic interferences. For example, the first end of the longitudinal connection element may be positioned and anchored in a hole of the upper skin section and may thus interfere with the air flow. Since the first end may have indentations in a head portion of the longitudinal connection element, the first end may be covered with a material, e.g., an adhesive or the like, such that this material fills the indentations and thus provides a top surface at the first end which is flush with the aerodynamic surface of the upper skin section.

According to an embodiment, the second end of the longitudinal connection element at least partially extends through the attachment unit and forces the attachment unit against the lower skin section of the aerodynamic structure component by pulling the attachment unit onto the lower skin section of the aerodynamic structure component.

In other words, the longitudinal connection element is fixed to the upper skin section and to the lower skin section such that it pulls, presses or clamps the attachment unit against an outer surface of the lower skin section. This may generate a tension force within the longitudinal connection element. It is possible, that the longitudinal connection element is mainly or exclusively subjected to a tension force while shear forces occurring between the aerodynamic structure component and the attachment unit are received by additional fastening elements, for example blind bolts, screws or the like, which also couple the attachment unit to the aerodynamic structure component.

The attachment unit, which may also be referred to as bracket, may join the aerodynamic structure component with a support structure and the base system. It may be fixed to the lower skin section of the aerodynamic structure component by a number of blind bolts, which in the example of a wing flap of an aircraft have two functions. First, these blind bolts take any shear forces in flight and spanwise direction between the attachment unit and the flap component. Additionally, they take partially the loads in vertical direction, i.e., perpendicular to the lower skin section or perpendicular to a contact surface between the attachment unit and the lower skin section.

According to an embodiment, the load introduction system, in particular the load introduction unit, further comprises a sleeve element extending through the lower skin section and at least partially enclosing the longitudinal connection element, wherein the sleeve element has a first end that is positioned adjacent the upper skin section and a second end that is positioned adjacent the lower skin section.

The sleeve element may have the function of limiting the compression which is applied to the aerodynamic structure component when the attachment unit is clamped against the lower skin section of the aerodynamic structure component. The sleeve element may comprise a tube-like structure and may thus also be referred to as compression tube. As mentioned above, the longitudinal connection element may be subjected to a tension force since it pulls the attachment unit onto the lower skin section. This pulling may generate a compression force onto the lower skin section that presses the lower skin section closer to the upper skin section, thereby exerting forces onto the radii in the connection areas where the spar elements join to the upper and lower skin sections. The sleeve element is adapted to receive a considerable portion of this compression force and thus to reduce the forces onto said radii.

According to an embodiment, the first end of the sleeve element axially contacts an enlarged head portion of the longitudinal connection element, the enlarged head portion being positioned at the first end of the longitudinal connection element. Alternatively, the first end of the sleeve element axially contacts a washer that is axially positioned between the first end of the sleeve element and an enlarged head portion of the longitudinal connection element, the enlarged head portion being positioned at the first end of the longitudinal connection element.

The enlarged head portion may be a bolt head or a screw head which laterally protrudes from a shaft of the longitudinal connection element. In this manner, it is possible that the enlarged head portion presses against the first or upper end of the sleeve element. It is also possible that at least a part of the enlarged head portion will provide the anchoring in the upper skin section as indicated above. In an alternative embodiment, however, an additional washer, herein also be referred to as countersunk washer, can be inserted between the sleeve element and the enlarged head portion. The loads between the upper skin section and the pre-tensioned longitudinal connection element can then be transferred via a countersunk face of the washer. To avoid any forces or stresses due to misalignment of the longitudinal axis of the pre-tensioned longitudinal connection element with the upper skin section, the interface between the enlarged head portion of the pre-tensioned longitudinal connection element and the countersunk washer can be formed spherically.

According to an embodiment, the first end of the sleeve element axially contacts the upper skin section.

This means that the first, upper end of the sleeve element does not contact the first end of the longitudinal connection element or does not contact any washer placed between the longitudinal connection element and the sleeve element. Instead, the first, upper end of the sleeve presses against the upper skin section of the aerodynamic structure component. In this manner, it is also possible to compensate for at least a part of the compression force onto the aerodynamic structure component that is generated when the longitudinal connection element clamps the attachment unit onto the lower skin section of the aerodynamic structure component.

According to an embodiment, the sleeve element is axially subjected to a compression force and the longitudinal connection element is axially subjected to a tension force when the longitudinal connection element forces the attachment unit against the lower skin section of the aerodynamic structure component.

As indicated above, such a force flow within the load introduction unit may considerably reduce the stresses within the aerodynamic structure component, especially within the radii between the spar elements and the skin sections. The inventive concept thus provides an improved force flow within an integrally formed flap structure such that, for instance, undesired material behaviors like "unfolding" of fiber reinforced material layers can be avoided.

According to an embodiment, the sleeve element is radially separated by a predetermined clearance from the longitudinal connection element. Alternatively or additionally, the attachment unit is radially separated by a predetermined clearance from the longitudinal connection element.

This may reduce the lateral or shear forces that act on the longitudinal connection element. In particular, it may be preferred that the longitudinal connection element mainly receives tension forces while shear forces are compensated otherwise, for example by additional bolts or screws. The radial clearance between an inner surface of the sleeve element and an outer surface of the longitudinal connection element may provide a free space between both elements. As indicated above, the longitudinal connection element may extend through the attachment unit, for example through a hole, e.g., a bore, within the attachment unit. Accordingly, the radial clearance between an inner surface of the hole in the attachment unit and the outer surface of the longitudinal connection element may also provide a free space between these both elements.

According to an embodiment, the longitudinal connection element comprises an enlarged head portion at the first end of the longitudinal connection element, wherein the first end of the sleeve element is axially separated by a predetermined clearance from a contact area of the enlarged head portion of the longitudinal connection element, from a washer positioned between the sleeve element and the enlarged head portion, or from the upper skin section of the aerodynamic structure component.

With this axially directed clearance or gap between the first, upper end of the sleeve element and the corresponding opposite part, the possible bending forces that act on the aerodynamic structure component when the longitudinal connection element clamps the attachment unit against the aerodynamic structure component can be adjusted. The length of the sleeve element, e.g., the compression tube, may thus intentionally be slightly shorter than the nominal distance between the countersunk washer and the attachment unit. The resulting, small gap between the first, upper end of the sleeve element and the bottom side of the countersunk washer or the enlarged head portion of the longitudinal connection element or the lower side of the upper skin section may have a typical size of a few tenths of a millimeter. The size of the gap determines the amount of clamping force acting onto the aerodynamic structure component. Once the gap is closed, any increase of the pretension of the longitudinal connection element will mainly increase only the compression forces inside the sleeve element.

Alternatively or additionally, the second end of the sleeve element is axially separated by a predetermined clearance from a contact area of the lower skin section of the aerodynamic structure component or from the attachment unit.

The clearance or gap that was described before, may thus also be provided between the second, lower end of the sleeve element on the one hand and the contact area of the lower skin section of the aerodynamic structure component or the attachment unit on the other.

According to an embodiment, the load introduction unit comprises a plurality of longitudinal connection elements, each of the longitudinal connection elements having a first end and a second end, wherein the first end of each longitudinal connection element is positioned at the upper skin section and each longitudinal connection element extends through the lower skin section of the aerodynamic structure component such that the second end of each longitudinal connection element is positioned outside of the aerodynamic structure component, and wherein the first end of each longitudinal connection element is anchored to the upper skin section of the aerodynamic structure component and the second end of each longitudinal connection element is anchored to the attachment unit such that each longitudinal connection element forces the attachment unit against the lower skin section of the aerodynamic structure component, thereby coupling the attachment unit to the aerodynamic structure component.

In other words, there may be several longitudinal connection elements being parts of the load introduction unit of the inventive load introduction system. All these longitudinal connection elements may have the same functions and characteristics as described with respect to the one longitudinal connection element above and below. In an example, each longitudinal connection element comprises a bolt-like structure with an enlarged head portion at its first end and a threaded portion at its second end.

According to an aspect, an aircraft comprising the load introduction system as described herein is provided.

According to another aspect, a method for manufacturing a load introduction system is provided. A step of the method includes manufacturing an aerodynamic structure component having an upper skin section and a lower skin section. Another step includes manufacturing an attachment unit. Another step includes coupling the attachment unit to the aerodynamic structure component by assembling a load introduction unit. The step of assembling the load introduction unit includes in another step providing a longitudinal connection element having a first end and a second end, and in a further step inserting the longitudinal connection element through the upper skin section and through the lower skin section such that the longitudinal connection element extends through the lower skin section of the aerodynamic structure component and the second end of the longitudinal connection element is positioned outside of the aerodynamic structure component. The step of assembling the load introduction unit further includes the step of anchoring the first end of the longitudinal connection element to the upper skin section of the aerodynamic structure component, and in a further step anchoring the second end of the longitudinal connection element to the attachment unit such that the longitudinal connection element forces the attachment unit against the lower skin section of the aerodynamic structure component, thereby coupling the attachment unit to the aerodynamic structure component.

The above-mentioned steps may be carried out in the specifically indicated order.

As explained above, the aerodynamic structure component may be an integrally formed structure made of CFRP. Such integrally manufactured, closed CFRP boxes have significant cost advantages when compared to differential box designs, which are usually assembled from a large number of different parts. For an aerodynamic structure component like a flap component in the form of a closed CFRP box, multi-spar designs are a preferred design solution, as they can be manufactured very conveniently with relatively low effort.

The inventive load introduction system may provide a concept for the load introduction into such a closed, multi-spar CFRP box, which fulfils the strength requirements and has low manufacturing/assembly costs in combination with a reliable and stable manufacturing/assembly process. Furthermore, the described load introduction concept reduces assembly cost, because it allows to install the necessary fittings completely from the outer side of the aerodynamic structure component with minimum preparation and installation effort. It does not require any access to the inner side of the closed box of the aerodynamic structure component.

Furthermore, the proposed concept might only have a minimum structural impact onto the closed box of the multi-spar aerodynamic structure component, as it does not require a large cut-out being milled into the skin sections of the aerodynamic structure component. Instead, only relatively small, cylindrical holes and countersunk holes can be drilled into the skin sections of the aerodynamic structure component. Thus, the proposed concept supports the manufacturing philosophy of a high rate at low cost. In addition, the proposed concept may require only a relatively simple, straight-forward multi-spar box without complex design features.

Furthermore, despite the simplified assembly, the concept may provide good structural strength and safety by avoiding the above mentioned "unfolding" of CFRP layers in the radii between spar elements and skin sections within the critical load introduction areas. In addition, the proposed concept can provide a configuration which still maintains a smooth aerodynamic surface of the skin sections of the aerodynamic structure component, and thus maintains possibly required aerodynamic high-lift performance requirements, depending on the field of application.

BRIEF DESCRIPTION OF THE DRAWINGS

The present invention will hereinafter be described in conjunction with the following drawing figures, wherein like numerals denote like elements, and wherein.

DETAILED DESCRIPTION

The representations and illustrations in the drawings are schematic and not to scale. A better understanding of the method and system described above may be obtained through a review of the illustrations accompanying this application together with a review of the detailed description that follows. FIGS. 1 to 4 show cross-sectional views through the exemplary load introduction system 1.

Figure 1:
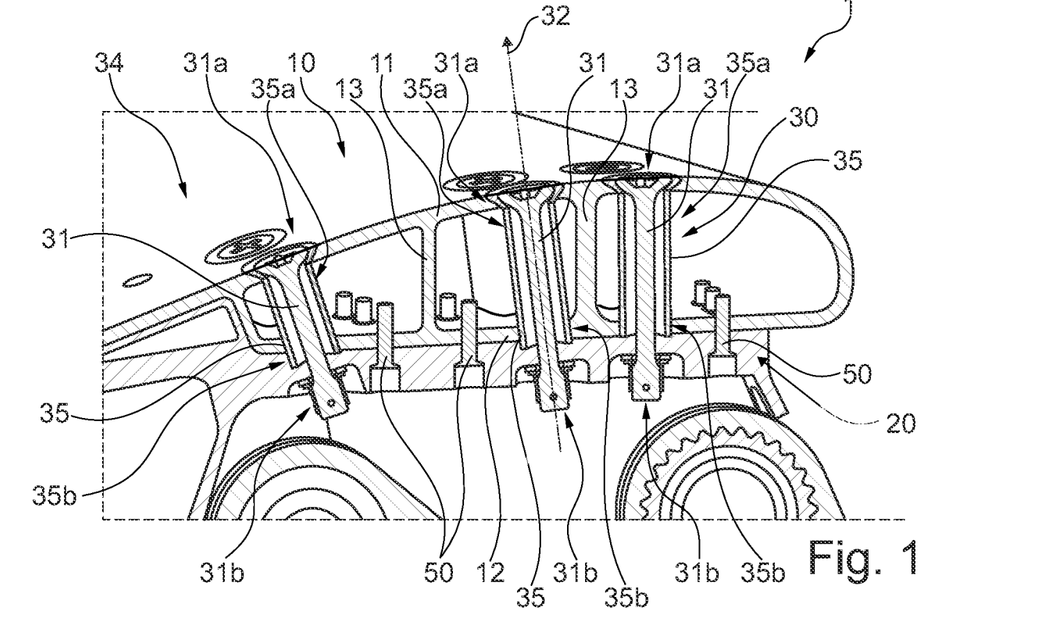
FIG. 1 shows a load introduction system.

FIG. 1 shows a load introduction system 1. The load introduction system 1 comprises an aerodynamic structure component 10 having an upper skin section 11 and a lower skin section 12, an attachment unit 20 for coupling the aerodynamic structure component 10 to a base system (not shown), and a load introduction unit 30 that couples the attachment unit 20 to the aerodynamic structure component 10 and transfers a load from the flap component 10 to the attachment unit 20 or vice versa.

In the following, the load introduction system 1 is described in more detail with an aerodynamic structure component 10 the form of a flap component 10. However, it is understood that the aerodynamic structure component 10 may be represented by other components like slats, ailerons, spoilers, flaperons, vertical and horizontal stabilizers, elevators, rudders, etc.

The load introduction unit 30 comprises multiple longitudinal connection elements 31, each having a first end 31a and a second end 31b. The first end 31a of the longitudinal connection elements 31 is positioned at the upper skin section 11 and the longitudinal connection elements 31 extend through the lower skin section 12 of the flap component 10 such that the second end 31b of each longitudinal connection element 31 is positioned outside of the flap component 10. The first end 31a of each longitudinal connection element 31 is anchored to the upper skin section 11 of the flap component 10 and the second end 31b of each longitudinal connection element 31 is anchored to the attachment unit 20 such that the longitudinal connection elements 31 force, e.g., pull or clamp, the attachment unit 20 against the lower skin section 12 of the flap component 10, thereby coupling the attachment unit 20 to the flap component 10.

The flap component 10 comprises a plurality of spar elements 13 extending within the flap component 10 between the first skin section 11 and the second skin section 12, wherein the plurality of spar elements 13 are integrally formed with the upper skin section 11 and the lower skin section 12. The flap component 10 may be an integrally formed structure made of a carbon fiber reinforced material. That is, the first skin section 11 and the second skin section 12 as well as the spar elements 13 together form an integrally formed structure. Due to the extension of the spar elements 13 between the lower and upper skin sections 11, 12, channels or spaces are provided within the flap component 10 which are separated from each other by the respective spar elements 13. The longitudinal connection elements 31 may extend through these channels or spaces. Due to the integral connection between a spar element 13 and the upper or lower skin sections 11, 12, several radii in the connecting region between a spar element 13 and the upper or lower skin sections 11, 12 may occur. These radii may be subjected to bending loads when the flap component 10 is in an assembled state, i.e., when the longitudinal connection elements 31 are pre-tensioned and clamp the attachment unit 20 against the lower skin section 12.

Holes or bores may be formed or drilled into the upper skin section 11 and into the lower skin section 12. Said longitudinal connection elements 31 may be arranged within the flap component 10 and may partially extend outside of the flap component 10 with their second ends 31b. As can be derived from FIG. 1, a longitudinal connection element 31 is anchored at the first or upper end 31a of the longitudinal connection element 31. For example, it engages or presses with its first end 31a against the upper skin section 11 in the direction of the second end 31b.

The longitudinal connection element 31 extends along a main extension direction 32 (indicated by an arrow) of the longitudinal connection element 31 and the upper skin section 11 has an aerodynamic surface 34. The main extension direction 32 of the longitudinal connection element 31 is arranged perpendicular with respect to the aerodynamic surface 34 of the upper skin section 11. As can be derived from FIG. 1, each of the longitudinal connection elements 31 is arranged perpendicular with respect to the aerodynamic surface 34 of the upper skin section 11. Accordingly, the main extension directions 32 of the corresponding longitudinal connection elements 31 may be angled with respect to each other due to the curved contour of the aerodynamic surface 34 of the upper skin section 11.

The load introduction unit 30 also includes sleeve elements 35, each of which extends through the lower skin section 12 and at least partially encloses a respective one of the longitudinal connection elements 31. Each sleeve element 35 has a first end 35a that is positioned adjacent the upper skin section 11 and a second end 35b that axially contacts the attachment unit 20 adjacent the lower skin section 12.

Each sleeve element 35 is radially separated by a predetermined clearance from the associated longitudinal connection elements 31. Furthermore, the attachment unit 20 is radially separated by a predetermined clearance from each of the longitudinal connection elements 31. This may reduce the lateral or shear forces that act on the longitudinal connection elements 31. In particular, the longitudinal connection elements 31 mainly receive tension forces while shear forces are compensated by additional bolts 50 or screws 50 which also extend through the attachment unit 20 and the lower skin section 12.

The load introduction concept provided by the inventive load introduction system 1 will be further explained with reference to FIGS. 3 and 4.

With reference now to FIG. 2, which again shows a part of the load introduction system 1 of FIG. 1, forces acting within the load introduction system 1 are visualized by corresponding arrows. In particular, this Figure shows the force flow or force flux within the different parts of the load introduction system 1.

Figure 2:
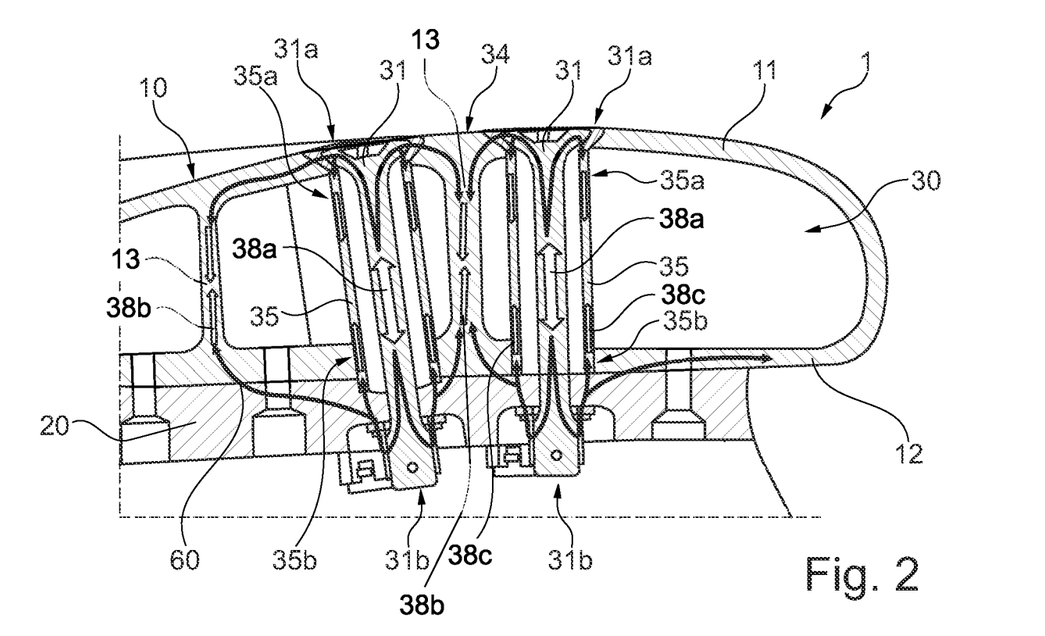
FIG. 2 shows the load introduction system of FIG. 1 with an indication of forces acting within the load introduction system.

As can be derived from FIG. 2, the longitudinal connection elements 31 are axially subjected to a tension force 38a when the load introduction unit 30 is in the assembled state, i.e., when the longitudinal connection elements 31 pull or clamp the attachment unit 20 onto a contact surface of the lower skin section 12. At the same time, a compression force 38b occurs in the spar elements 13 since the pre-tensioned longitudinal connection elements 31, when anchored to the attachment unit 20 and the upper skin section 11, act to compress the flap component 10, i.e., act to oppositely press onto the upper skin section 11 and the lower skin section 12 bringing them closer to each other. The provision of the sleeve elements 35, however, may reduce or limit this compression force which is applied to the flap component 10 when the attachment unit 20 is clamped by the pre-tensioned longitudinal connection elements 31 against the lower skin section 12 of the flap component 10. The sleeve elements 35 comprise a tube-like structure which encloses the respective longitudinal connection element 31 while providing a certain radial clearance to them. The sleeve elements 35 are adapted to receive a considerable portion of the compression force onto the flap component 10 and thus to reduce the forces onto the radii located between the spar elements 13 on the one hand and the upper and lower skin sections 11, 12 on the other. In other words, the sleeve elements 35 are also axially subjected to a compression force 38c.

Figure 3:
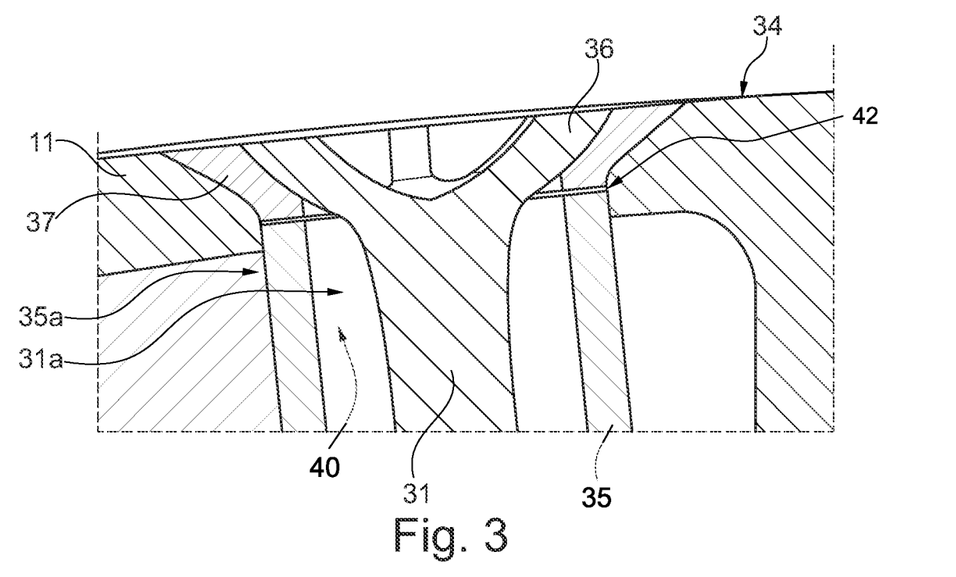
FIG. 3 shows a detailed view of a first end of a longitudinal connection element of the load introduction system of FIG. 1.

FIG. 3 shows a detailed view of the first end 31a of the longitudinal connection element 31 of the load introduction system 1 of FIG. 1. Also shown is the first end 35a of the sleeve element 35 that is positioned adjacent the upper skin section 11. The longitudinal connection element 31 comprises an enlarged head portion 36 at the first end 31a of the longitudinal connection element 31. In this configuration, the enlarged head portion 36 is a bolt head or screw head which laterally protrudes from the shaft of the longitudinal connection element 31.

The sleeve element 35 is axially separated by a predetermined clearance 42 from a washer 37, e.g., a countersunk washer 37, that is positioned between the first end 35a of the sleeve element 35 and the enlarged head portion 36. In an alternative example, which is not shown, an axial clearance may be provided between the first end 35a of the sleeve element 35 and the upper skin section 11, for example if there is no washer 37 present and if thus the upper skin section 11 is arranged between the enlarged head portion 36 and the first end 35a of the sleeve element 35.

Upon bringing the longitudinal connection element 31 into the pre-tensioned state, the clearance 42 will reduce or even vanish, since the washer 37 and/or the enlarged head portion 36 will be moved towards and press against the first end 35a of the sleeve element 35. The first end 35a of the sleeve element 35 may then axially contact the washer 37 or the enlarged head portion 36 of the longitudinal connection element 31.

Each longitudinal connection element 31 of the load introduction unit 30 described with reference to FIG. 1 may have a corresponding washer 37 as shown in FIG. 3. In an example, two or more washers 37 can be combined into an anchor plate (not shown) which is fixed to the upper skin section 11. Furthermore, each of the pre-tensioned longitudinal connection elements 31 is installed perpendicular to the upper, aerodynamic surface 34 of the upper skin section 11 of the flap component 10. Thus, the first ends 31a of the longitudinal connection elements 31, which may be in the form of bolt heads 36, and the countersunk washers 37 may preferably stay inside the nominal aerodynamic contour 34 of the upper skin section 11. The required outer contour can be re-established, for example, with a plug or a self-adhesive film (both not shown) bonded over the bolt heads 36.

As can also be derived from FIG. 3, the sleeve element 35 is radially separated by a predetermined clearance 40 from the longitudinal connection element 31. In particular, the clearance 40 may be present between an inner surface of the tube-like sleeve element 35 and an outer surface of the bolt-like longitudinal connection element 31.

Figure 4:
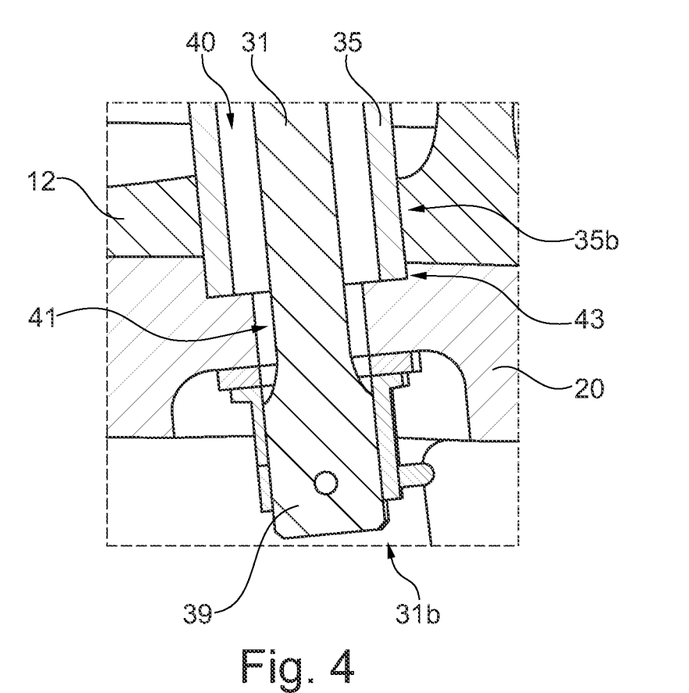
FIG. 4 shows a detailed view of a second end of a longitudinal connection element of the load introduction system of FIG. 1.

FIG. 4 shows a detailed view of the second end 31b of the longitudinal connection element 31 of the load introduction system 1 of FIG. 1. Also shown is the second end 35b of the sleeve element 35 that is positioned adjacent the lower skin section 12. The longitudinal connection element 31 comprises a threaded portion 39 at the second end 31b of the longitudinal connection element 31. In this configuration, also the threaded portion 39 laterally protrudes from the shaft of the longitudinal connection element 31.

The threaded portion 39 may serve as a fixation member which is adapted to secure the second end 31b of the longitudinal connection element 31 to the attachment unit 20. For example, a screw nut can be used to fasten the attachment unit 20 to the second end 31b via the threaded portion 39 of the longitudinal connection element 31. An additional pin or other locking mechanism can be used to secure the screw nut on the threaded portion 39 of the longitudinal connection element 31. In the illustrated configuration, a portion of the attachment unit 20 is clamped between the screw nut which is threaded onto the threaded portion 39 of the longitudinal connection element 31 and the second end 35b of the sleeve element 35. Additional washers or shims may be used here as well.

The sleeve element 35 may be axially separated by another predetermined clearance 43 from the attachment unit 20 as shown in FIG. 4. In an alternative example, this axial clearance 43 may be provided between a contact area of the lower skin section 12 and the second end 35b of the sleeve element 35.

As can also be seen in FIG. 4, the longitudinal connection element 31 completely extends through the lower skin section 12 and at least partially through the attachment unit 20, i.e., through a hole or a bore, within the attachment unit 20. Therefore, a radial clearance 41 between an inner surface of the hole in the attachment unit 20 and the outer surface of the longitudinal connection element 31 element may also be present. Again, also the radial clearance 40 between the inner surface of the tube-like sleeve element 35 and an outer surface of the bolt-like longitudinal connection element 31 is shown. In an example, the sleeve elements 35 interface in their axial direction only with a bottom side of the metal countersunk washers 37 (cf. FIG. 3) and a top side of the attachment unit 20 (cf. FIG. 4).

The axial clearance or gap sizes 42, 43 described with reference to FIGS. 3 and 4 may vary slightly based on the specific dimensions and configurations of the longitudinal connection elements 31 and the flap component 10, which might be due to manufacturing tolerances. The strength of the flap component 10 and the radii regions may be designed such that a wide range of axial gap sizes 42, 43 and the resulting bending deflections of the skin sections 11, 12 can be covered. However, axial gap sizes 42, 43, exceeding a predefined, allowed range, can be reduced by either selecting a sleeve element 35 with a slightly different length, or adding shims in the form of thin washers in the gaps 42, 43 to protect the flap component 10 from unintentional damage during assembly.

In an example, which is not shown, the sleeve element 35 has its upper, axial interface at the first end 35a with the bottom respectively inner side of the upper skin section 11 of the flap component 10. Thus, the upper skin section 11 may be clamped between the countersunk washer 37 and sleeve element 35. This variant does not require any nominal gap between sleeve element 35 and the contact area of the interfacing structure.

Figure 5:
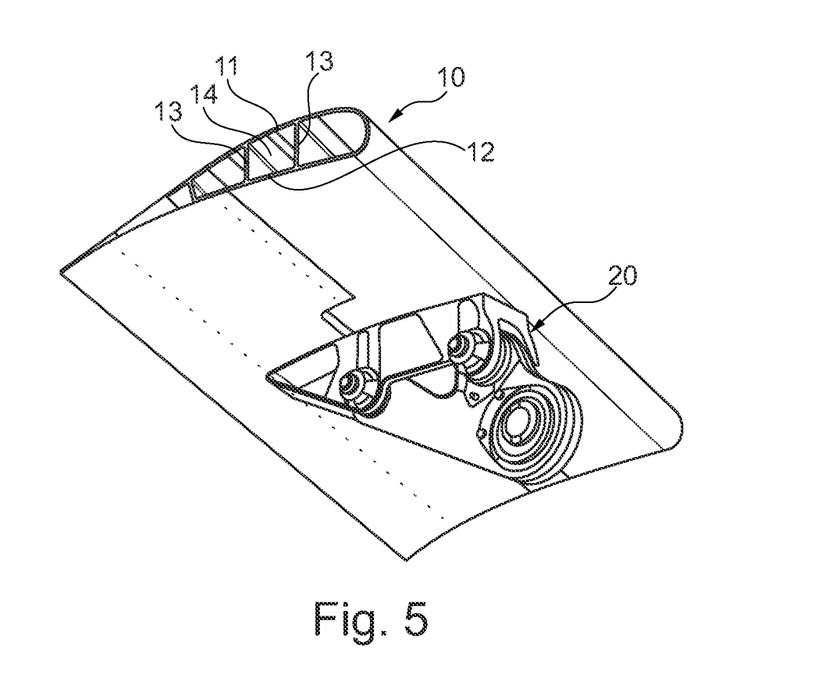
FIG. 5 shows a lower perspective view of a flap component.

FIG. 5 shows a lower perspective view of the flap component 10 of the load introduction system 1 of FIG. 1. As can be derived from this illustration the attachment unit 20 is positioned at the lower side, i.e., at the lower skin section 12, of the flap component 10. What can also be seen in this Figure is the integral structure of the flap component 10 in which the spar elements 13 as well as the upper skin section 11 and the lower skin section 12 are integrally formed. The channels 14 are thus provided and extend within the flap component 10. The attachment unit 20 may be adapted or designed to couple the load introduction system 1 including the flap component 10 and the assembled load introduction unit 30 to a base system 100 like an aircraft 100 as shown in FIG. 6.

Figure 6:
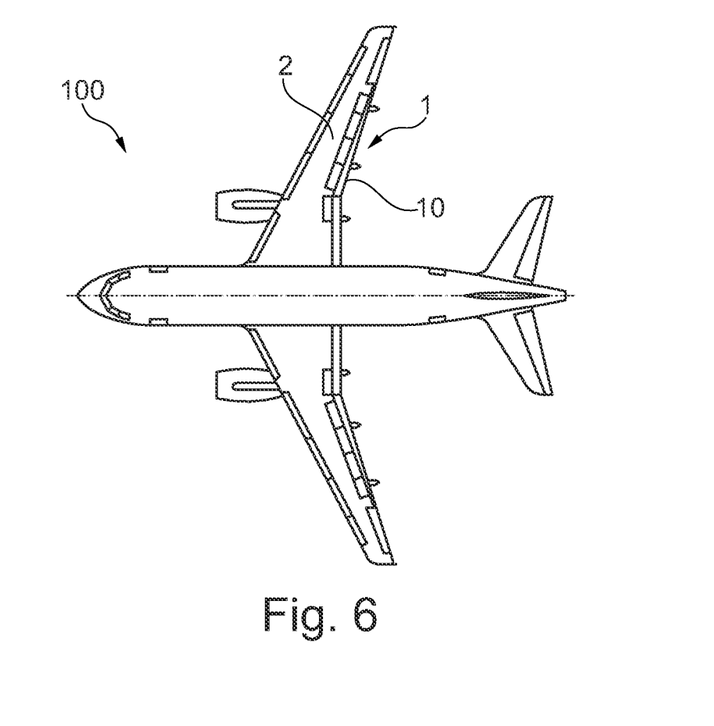
FIG. 6 shows an aircraft comprising the load introduction system of FIG. 1.

In particular, FIG. 6 shows an aircraft 100 comprising the load introduction system 1 of FIG. 1. The load introduction system 1, in particular its attachment unit 20 (cf. FIG. 5) couples the flap component 10 to a wing structure 2 of the aircraft 100. However, other applications for the inventive load introduction system 1 as described herein are possible.

Figure 7:
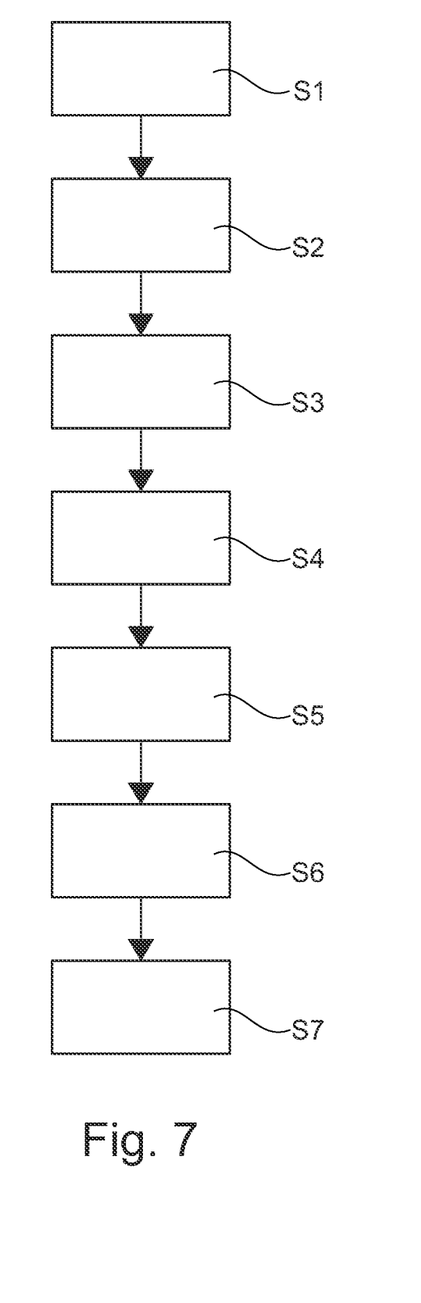
FIG. 7 shows a flow diagram of a method for manufacturing a load introduction system.

FIG. 7 shows a flow diagram of a method for manufacturing a load introduction system, for example the load introduction system 1 as shown in FIG. 1. In a step S1 of the method, a flap component 10 having an upper skin section 11 and a lower skin section 12 is manufactured. In another step S2, an attachment unit 20 is manufactured. In yet another step S3, the attachment unit 20 is coupled to the flap component 10 by assembling a load introduction unit 30, wherein assembling the load introduction unit 30 comprises a step S4 of providing a longitudinal connection element 31 having a first end 31a and a second end 31b, and a step S5 of inserting the longitudinal connection element 31 through the upper skin section 11 and through the lower skin section 12 such that the longitudinal connection element 31 extends through the lower skin section 12 of the flap component 10 and the second end 31b of the longitudinal connection element 31 is positioned outside of the flap component 10. The assembling of the load introduction unit 30 further comprises a step S6 of anchoring the first end 31a of the longitudinal connection element 31 to the upper skin section 11 of the flap component 10 and a step S7 of anchoring the second end 31b of the longitudinal connection element 31 to the attachment unit 20 such that the longitudinal connection element 31 forces the attachment unit 20 against the lower skin section 12 of the flap component 10, thereby coupling the attachment unit 20 to the flap component 10.

The invention claimed is:

1. A load introduction system, comprising:
    an aerodynamic structure component having an upper skin section and a lower skin section;
    an attachment unit for coupling the aerodynamic structure component to a base system;
    a load introduction unit configured to couple the attachment unit to the aerodynamic structure component and to transfer a load from the aerodynamic structure component to the attachment unit;
    wherein the load introduction unit comprises a longitudinal connection element having a first end and a second end;
    wherein the first end of the longitudinal connection element is positioned at the upper skin section and the longitudinal connection element extends through the lower skin section of the aerodynamic structure component such that the second end of the longitudinal connection element is positioned outside of the aerodynamic structure component;
    wherein the first end of the longitudinal connection element is anchored to the upper skin section of the aerodynamic structure component and the second end of the longitudinal connection element is anchored to the attachment unit such that the longitudinal connection element forces the attachment unit against the lower skin section of the aerodynamic structure component, thereby coupling the attachment unit to the aerodynamic structure component;
    wherein the longitudinal connection element extends along a main extension direction of the longitudinal connection element;
    wherein the upper skin section has an aerodynamic surface;
    wherein the main extension direction of the longitudinal connection element is arranged substantially perpendicular with respect to the aerodynamic surface of the upper skin section such that the extension direction is at an angle relative to a second longitudinal connection element in a chordwise direction; and,
    wherein the second longitudinal connection element extends from the upper aerodynamic surface through the lower skin section of the structural component.

2. The load introduction system according to claim 1, wherein the aerodynamic structure component is a flap.

3. The load introduction system according to claim 1, wherein the aerodynamic structure component is an integrally formed structure.

4. The load introduction system according to claim 1, wherein the aerodynamic structure component includes a plurality of spar elements extending within the aerodynamic structure component between the first skin section and the second skin section; and
    wherein the plurality of spar elements is integrally formed with the upper skin section and the lower skin section, thereby providing an integrally formed aerodynamic structure component.

5. The load introduction system according to claim 1, wherein the aerodynamic structure component is made of a carbon fiber reinforced material.

6. The load introduction system according to claim 1, wherein the second end of the longitudinal connection element at least partially extends through the attachment unit and forces the attachment unit against the lower skin section of the aerodynamic structure component by pulling the attachment unit onto the lower skin section of the aerodynamic structure component.

7. The load introduction system according to claim 1, further comprising a sleeve element extending through the lower skin section, wherein a first end of the sleeve element axially contacts an enlarged head portion of the longitudinal connection element, the enlarged head portion being positioned at the first end of the longitudinal connection element; or
    wherein the first end of the sleeve element axially contacts a washer that is axially positioned between the first end of the sleeve element and an enlarged head portion of the longitudinal connection element, the enlarged head portion being positioned at the first end of the longitudinal connection element.

8. The load introduction system according to claim 7, wherein the first end of the sleeve element axially contacts the upper skin section.

9. The load introduction system according to claim 7, wherein the sleeve element is axially subjected to a compression force and the longitudinal connection element is axially subjected to a tension force when the longitudinal connection element forces the attachment unit against the lower skin section of the aerodynamic structure component.

10. The load introduction system according to claim 7, wherein the longitudinal connection element comprises an enlarged head portion at the first end of the longitudinal connection element;
   wherein the first end of the sleeve element is axially separated by a predetermined clearance from at least one of a contact area of the enlarged head portion of the longitudinal connection element, a washer positioned between the sleeve element and the enlarged head portion, or the upper skin section of the aerodynamic structure component; and/or
   wherein the second end of the sleeve element is axially separated by a predetermined clearance from at least one of a contact area of the lower skin section of the aerodynamic structure component or the attachment unit.

11. The load introduction system according to claim 1, wherein the attachment unit is radially separated by a predetermined clearance from the longitudinal connection element.

12. The load introduction system according to claim 1, wherein the load introduction unit comprises a plurality of the longitudinal connection elements, each of the plurality of longitudinal connection elements having a first end and a second end;
   wherein the first end of each longitudinal connection element is positioned at the upper skin section and each longitudinal connection element extends through the lower skin section of the aerodynamic structure component such that the second end of each longitudinal connection element is positioned outside of the aerodynamic structure component;
   wherein the first end of each longitudinal connection element is anchored to the upper skin section of the aerodynamic structure component and the second end of each longitudinal connection element is anchored to the attachment unit such that each longitudinal connection element forces the attachment unit against the lower skin section of the aerodynamic structure component, thereby coupling the attachment unit to the aerodynamic structure component.

13. An aircraft comprising the load introduction system according claim 1.

14. A method for manufacturing the load introduction system accordingly to claim 1, comprising:
   manufacturing the aerodynamic structure component;
   manufacturing the attachment unit; and,
   coupling the attachment unit to the aerodynamic structure component by assembling the load introduction unit.

* * * * *